United States Patent
Ahn et al.

(10) Patent No.: US 7,787,914 B2
(45) Date of Patent: Aug. 31, 2010

(54) MOBILE COMMUNICATION TERMINAL HAVING OPENING MECHANISM

(75) Inventors: Byung-Jin Ahn, Seoul (KR); Kwang-Hyun Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 1035 days.

(21) Appl. No.: 11/469,063

(22) Filed: Aug. 31, 2006

(65) Prior Publication Data
US 2007/0054636 A1    Mar. 8, 2007

(30) Foreign Application Priority Data

| Sep. 2, 2005 | (KR) | ...................... 10-2005-0081940 |
| Sep. 8, 2005 | (KR) | ...................... 10-2005-0083880 |
| Sep. 29, 2005 | (KR) | ...................... 10-2005-0091620 |

(51) Int. Cl.
*H04M 1/00* (2006.01)

(52) U.S. Cl. ............... 455/575.3; 455/575.1; 455/575.4

(58) Field of Classification Search ............. 455/575.1, 455/575.3, 575.4
See application file for complete search history.

(56) References Cited

U.S. PATENT DOCUMENTS

| 4,897,873 A | 1/1990 | Beutler et al. |
| 5,185,790 A | 2/1993 | Mischneko |
| 6,085,387 A * | 7/2000 | Han ............................. 16/330 |
| 7,027,846 B2 * | 4/2006 | Pan .......................... 455/575.3 |
| 7,353,050 B2 * | 4/2008 | Im et al. ................... 455/575.3 |
| 7,515,707 B2 * | 4/2009 | Ka et al. ................ 379/433.12 |
| 2004/0020012 A1 | 2/2004 | Gupte |
| 2005/0102798 A1 * | 5/2005 | Kato ........................... 16/366 |
| 2005/0155182 A1 | 7/2005 | Han et al. |
| 2005/0219372 A1 * | 10/2005 | Watanabe .............. 348/207.99 |
| 2005/0239520 A1 * | 10/2005 | Stefansen ................ 455/575.1 |
| 2005/0257343 A1 | 11/2005 | Gupte |
| 2006/0270469 A1 * | 11/2006 | Godston et al. .......... 455/575.3 |
| 2009/0149226 A1 * | 6/2009 | Watanabe ................ 455/575.3 |

FOREIGN PATENT DOCUMENTS

| JP | 2005-299924 A | 10/2005 |
| WO | 90/05421 | 5/1990 |
| WO | 92/17973 | 10/1992 |
| WO | 2004/013439 | 2/2004 |
| WO | 2004/066597 | 8/2004 |

* cited by examiner

*Primary Examiner*—Lester Kincaid
*Assistant Examiner*—Charles Shedrick
(74) *Attorney, Agent, or Firm*—Birch, Stewart, Kolasch & Birch, LLP

(57) ABSTRACT

A mobile communication terminal includes a first body, a second body foldably coupled to the first body, and an opening mechanism that rotates the second body with respect to the first body in response to a sliding movement of the second body.

27 Claims, 16 Drawing Sheets

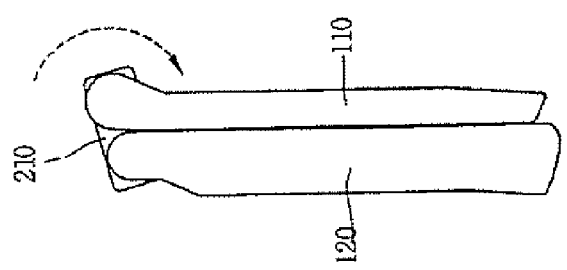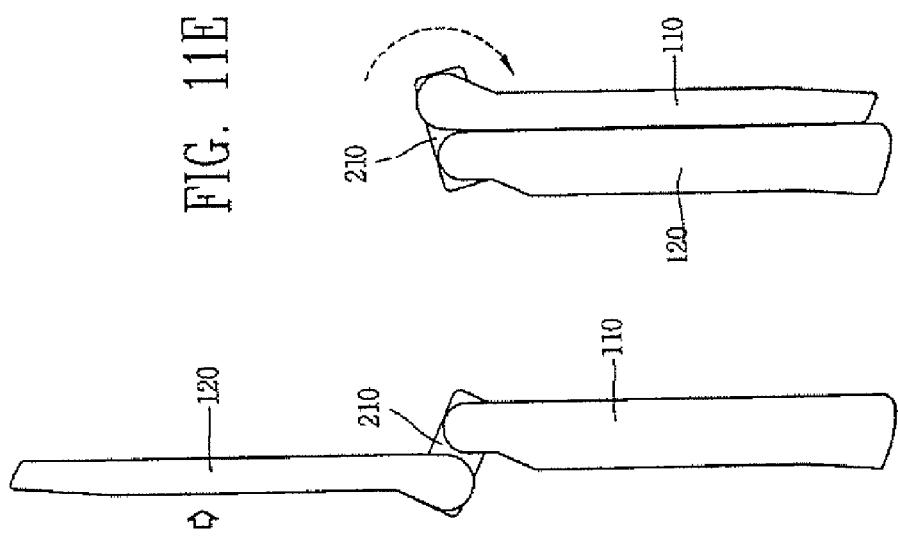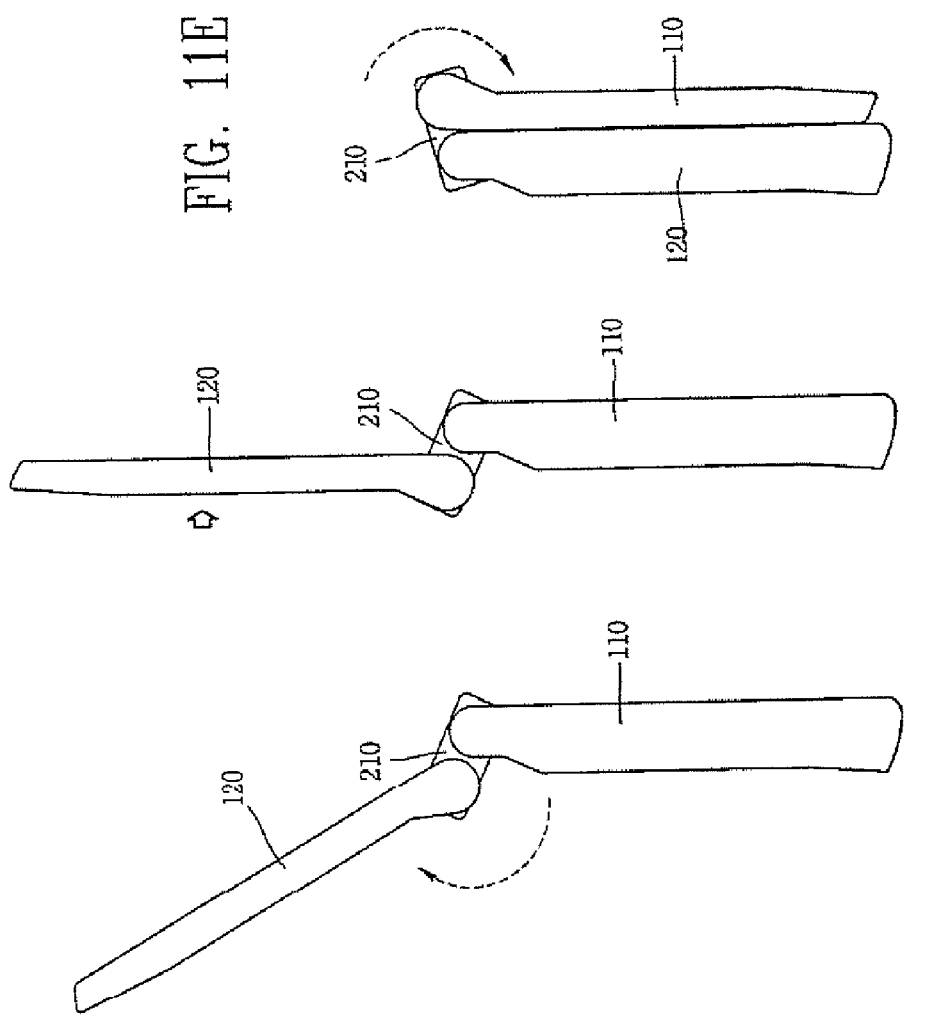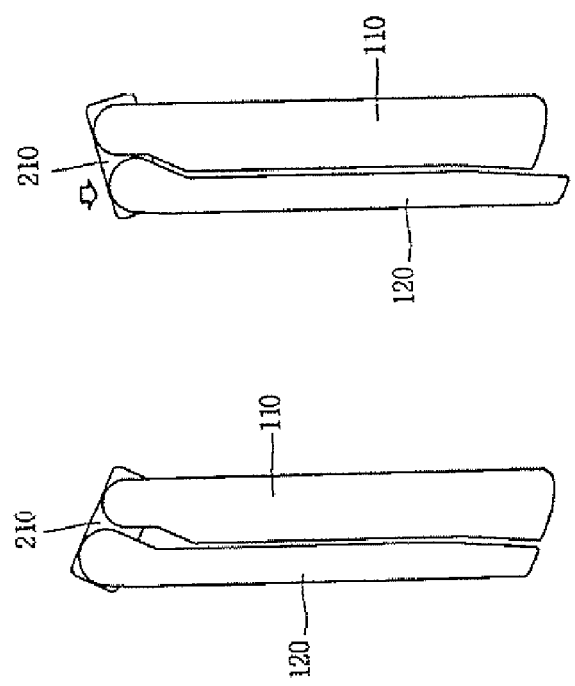

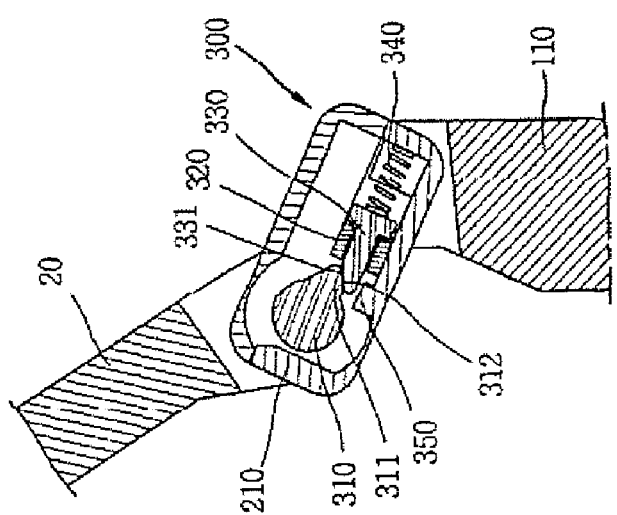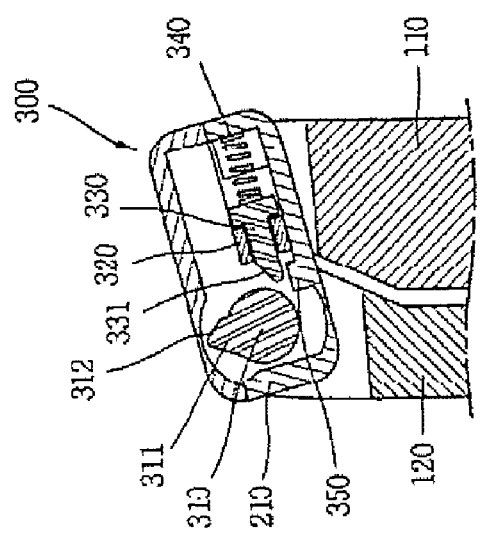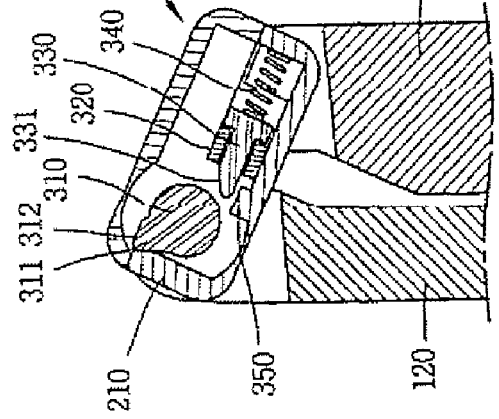

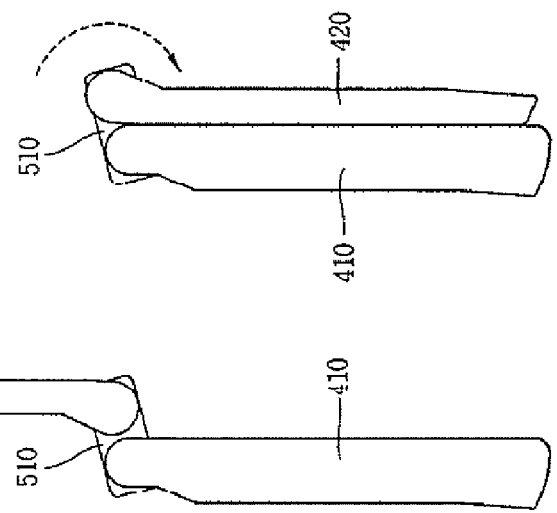
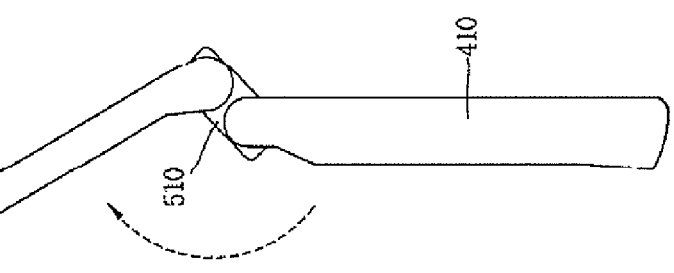
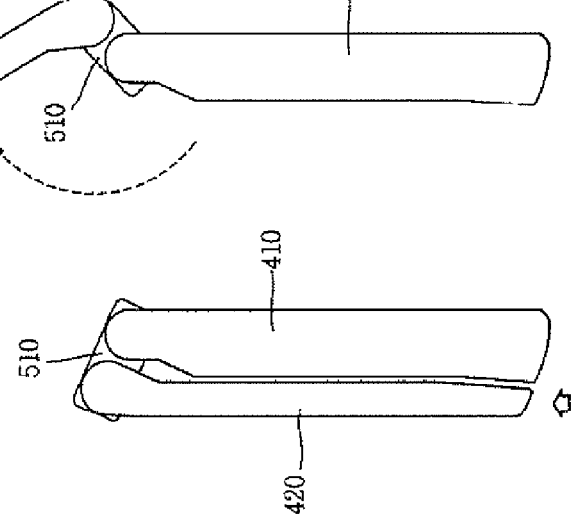
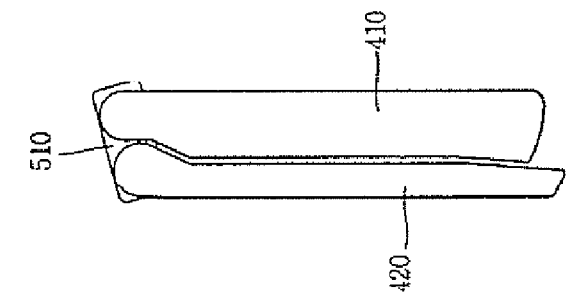

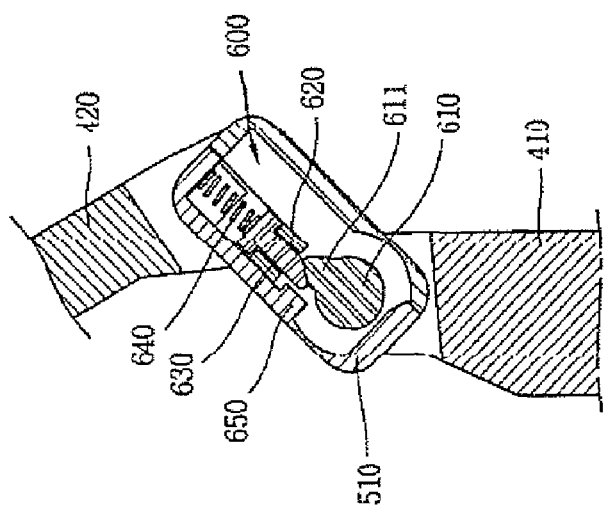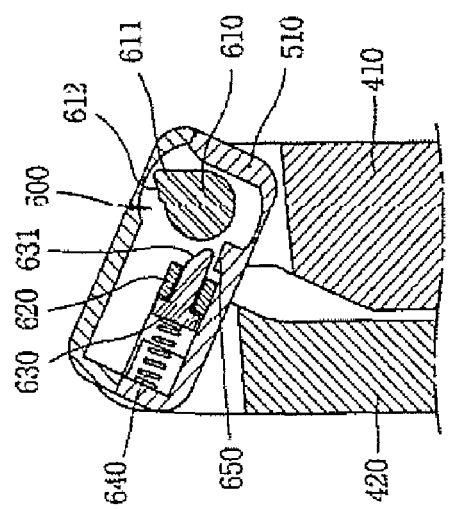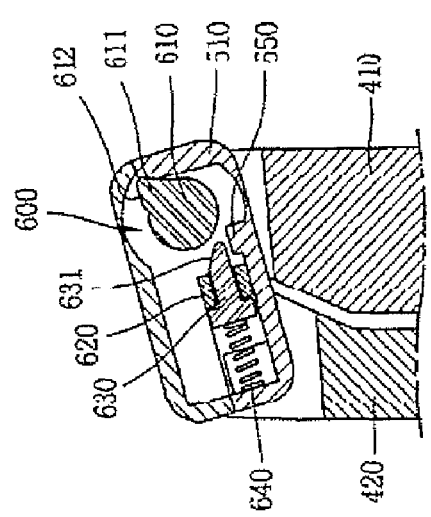

MOBILE COMMUNICATION TERMINAL HAVING OPENING MECHANISM

This application claims the benefit of Korean Patent Application No. 10-2005-0081940, filed on Sep. 2, 2005, Korean Patent Application No. 10-2005-0083880, filed on Sep. 8, 2005, and Korean Patent Application No. 10-2005-0091620, filed on Sep. 29, 2005, which are hereby incorporated by reference in their entireties.

BACKGROUND OF THE INVENTION

1. Field of the Invention

The present invention relates to a mobile communication terminal, and more particularly, to a mobile communication terminal having an opening mechanism that facilitates an opening operation of the mobile communication terminal.

2. Description of Related Art

Generally, a mobile communication terminal, such as a mobile phone or personal digital assistant (PDA), is a portable device which wirelessly communicates information.

With the advance of communication and memory technologies, mobile communication terminals are now being provided with extra functions. In addition to a telephony function, some mobile communication terminals are now being provided with a function for capturing still or moving images, a function for reproducing or editing multimedia files, and/or a function for viewing a television program. To enhance user convenience, the size and weight of mobile communication terminals are also decreasing.

FIGS. 1 and 2 show a conventional mobile communication terminal. The mobile communication terminal 10 shown in FIG. 1 includes a first body 20, and a second body 30, coupled to the first body 20, which opens by rotating with respect to the first body 20.

An inner surface of the first body 20 of the mobile communication terminal 10 shown in FIG. 2 includes a key pad 21, which includes a plurality of keys for entering information and control commands, and a microphone 22 that receives a voice.

An inner surface of the second body 30 includes a first display 31 which displays visual information, and a speaker 34 that outputs a voice signal. As shown in FIG. 1, an outer surface of the second body 30 includes a second display 32 which displays visual information. As shown in FIG. 1, the second display 32 can be viewed without opening the second body 30.

The mobile communication terminal 10 also includes a hinge portion 40 for rotating the second body 30 with respect to the first body 20.

The hinge portion 40 includes a first hinge portion 41, which is formed at ends of an upper end of the first body 20, and a second hinge portion 42, which is formed at an end of the second body 30 and is positioned between the ends of the first hinge portion 41 to form a hinge with the first hinge portion 41. An elastic portion (not shown) is provided inside the first hinge portion 41 or the second hinge portion 42 to provide an elastic force for opening the second body 30.

When a user begins rotating the second body 30 open, the elastic portion provides a force to the second body 30 which flips the second body 30 open to a fully open position.

The fully open position is defined by a stopper (not shown), which stops the rotation of the second body 30. Typically, there is an angle of approximately 150° between the first body 20 and the second body 30 when the second body 30 is in a fully open position, as this positioning conforms well to the shape of a user's head.

The conventional mobile communication terminal 10 has at least the following shortcomings. To open the second body 30, the user must pry the second body 30 away from the first body 20, which is inconvenient to the user.

SUMMARY OF THE INVENTION

One of the features of the present invention is an opening mechanism which conveniently opens a mobile communication terminal.

Another feature is a mechanism which holds a mobile communication terminal open at a plurality of predetermined angles corresponding to various functions.

To achieve at least these features, there is provided a mobile communication terminal which includes a first body, a second body foldably coupled to the first body, and an opening mechanism that rotates the second body with respect to the first body in response to a sliding movement of the second body.

The opening mechanism may rotate the second body when the second body is slid downward. The opening mechanism may include a hinge connection portion having one end connected to the first body by a first hinge portion, and another end connected to the second body by a second hinge portion, and a first elastic force providing unit, provided in the hinge connection portion, that rotates the second body open when the second body is slid downward. The hinge connection portion may be inclinably arranged so that the second hinge portion is positioned higher than the first hinge portion when the second body is closed.

The first elastic force providing unit may include a housing fixed to the hinge connection portion and having a receiving space therein, a fixed cam fixed to the second body, a movable cam, linearly movable in the receiving space of the housing, that rotates the fixed cam such that the second body rotates open when the second body is slid downward, and a spring, provided between the movable cam and the housing, that elastically moves the movable cam towards the fixed cam. The movable cam may have a cam profile defining a spacing between the movable cam and the fixed cam. The movable cam may include a first cam profile having a first radius and a second cam profile having a second radius, the first and second cam profiles being symmetrical and centered on a cam shaft.

The opening mechanism may also include a second elastic force providing unit, provided in the hinge connection portion, that restores the hinge connection portion to an initial position after a force which causes the sliding movement of the second body is removed. The second elastic force providing unit may include a housing fixed to the hinge connection portion and having a receiving space therein, a fixed cam fixed to the first body, a movable cam, linearly movable in the receiving space of the housing, that rotates the fixed cam such that the hinge connection portion is restored to the initial position, and a spring, provided between the movable cam and the housing, that elastically moves the movable cam towards the fixed cam.

The movable cam of the second elastic force providing unit may have a cam profile defining a spacing between the movable cam of the second elastic force providing unit and the fixed cam of the second elastic force providing unit. The movable cam of the second elastic force providing unit may include a first cam profile having a first radius and a second cam profile having a second radius, the first and second cam profiles of the movable cam of the second elastic force providing unit being symmetrical and centered on a cam shaft.

The opening mechanism may rotate the second body when the second body is slid upward. The first body may include a terminal body, and the second body may include a display unit that displays visual information.

There is also provided a mobile communication terminal which includes a first body, a second body foldably coupled to the first body, an opening mechanism that rotates the second body with respect to the first body in response to a sliding movement of the second body, and a stopper that holds the second body open at a plurality of angles.

The opening mechanism may rotate the second body when the second body is slid downward. The opening mechanism may include a hinge connection portion having one end connected to the first body by a first hinge portion, and another end connected to the second body by a second hinge portion, a first elastic force providing unit, provided in the hinge connection portion, that rotates the second body open when the second body is slid downward, and a second elastic force providing unit installed between the first body and the hinge connection portion, provided in the hinge connection portion, that restores the hinge connection portion to an initial position after a force which causes the sliding movement of the second body is removed.

The hinge connection portion may be inclinably arranged so that the second hinge portion is positioned higher than the first hinge portion when the second body is closed. The first elastic force providing unit may include a housing fixed to the hinge connection portion and having a receiving space therein, a fixed cam fixed to the second body, a movable cam, linearly movable in the receiving space of the housing, that rotates the fixed cam such that the second body rotates open when the second body is slid downward, and a spring, provided between the movable cam and the housing, that elastically moves the movable cam towards the fixed cam.

The movable cam may have a cam profile defining a spacing between the movable cam and the fixed cam, the movable cam may include a first cam profile having a first radius and a second cam profile having a second radius, the first and second cam profiles being symmetrical and centered on a cam shaft.

The second elastic force providing unit may include a housing fixed to the hinge connection portion and having a receiving space therein, a fixed cam fixed to the first body, a movable cam, linearly movable in the receiving space of the housing, that rotates the fixed cam such that the hinge connection portion is restored to the initial position, and a spring, provided between the movable cam and the housing, that elastically moves the movable cam towards the fixed cam.

The movable cam of the second elastic force providing unit may have a cam profile defining a spacing between the movable cam of the second elastic force providing unit and the fixed cam of the second elastic force providing unit. The movable cam of the second elastic force providing unit may include a first cam profile having a first radius and a second cam profile having a second radius, the first and second cam profiles of the movable cam of the second elastic force providing unit being symmetrical and centered on a cam shaft.

The stopper may be provided in the hinge connection portion and include a cam fixed to the second hinge portion, a linearly movable operation rod that stops a rotation of the cam, and a spring that pushes the operation rod towards the cam. The stopper may include a guide member that guides the operation rod. The stopper may include a stopping jaw that stops a rotation of the cam when the cam pushes the operation rod. The stopping jaw may hold the second body open at an angle of 360° with respect to the first body.

A protrusion may be formed on the cam which abuts a stopping surface of the operation rod. The stopper may hold the second body at angles of 150° and 180°. The opening mechanism may rotate the second body when the second body is slid upward. The first body may include a terminal body, and the second body may include a display unit that displays visual information.

Other exemplary embodiments and features of the present invention may be ascertained by reviewing the present disclosure and the accompanying drawings.

BRIEF DESCRIPTION OF THE DRAWINGS

The present invention is further described in the detailed description which follows, with reference to the following noted drawings which illustrate non-limiting examples of embodiments of the present invention, and in which like reference numerals represent similar parts throughout the drawings.

FIGS. 11A to 11E are views showing an operation of the mobile communication terminal of FIG. 3;

FIGS. 12A to 12E are views showing an operation of the stopper of FIG. 10;

FIGS. 15A to 15E are views showing an operation of the mobile communication terminal of FIG. 13; and FIGS. 16A to 16E are views showing an operation of the stopper shown in FIG. 14.

DETAILED DESCRIPTION OF THE INVENTION

Figure 1:
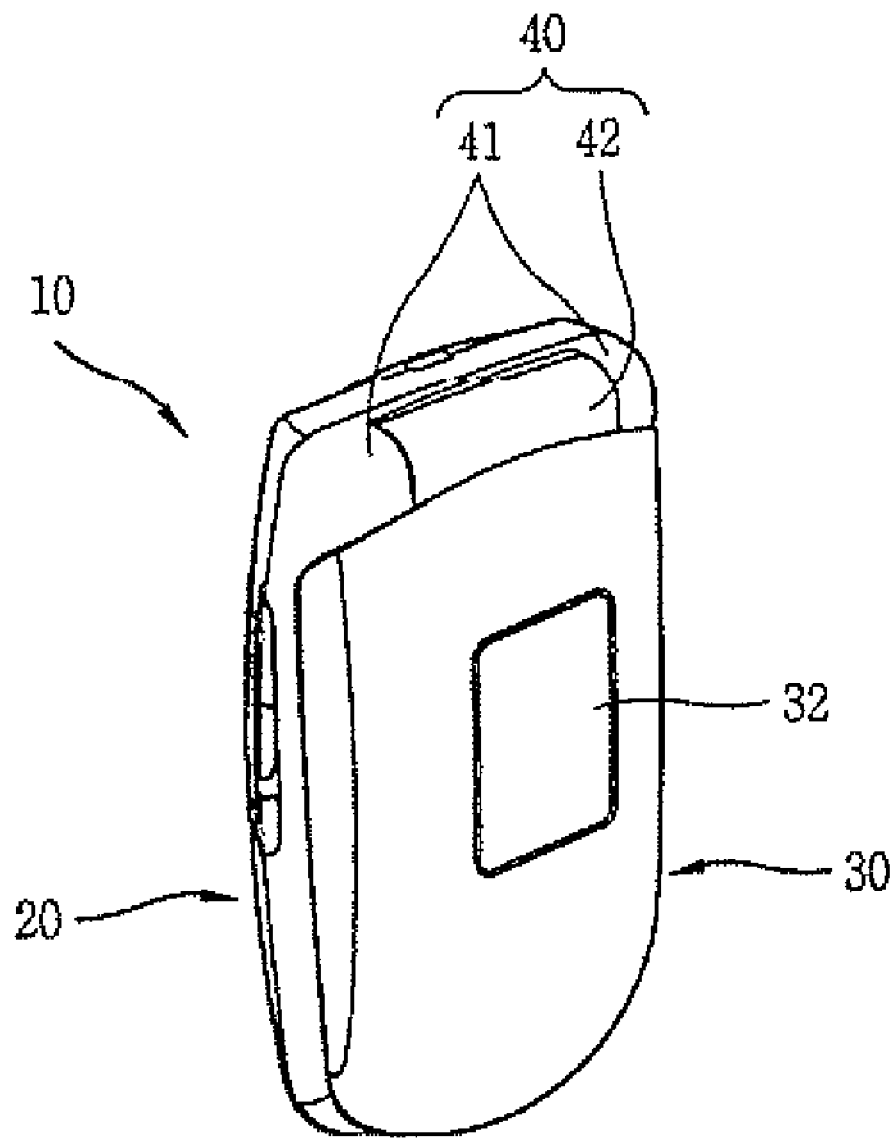
FIG. 1 is a perspective view of a conventional mobile communication terminal.
Figure 2:
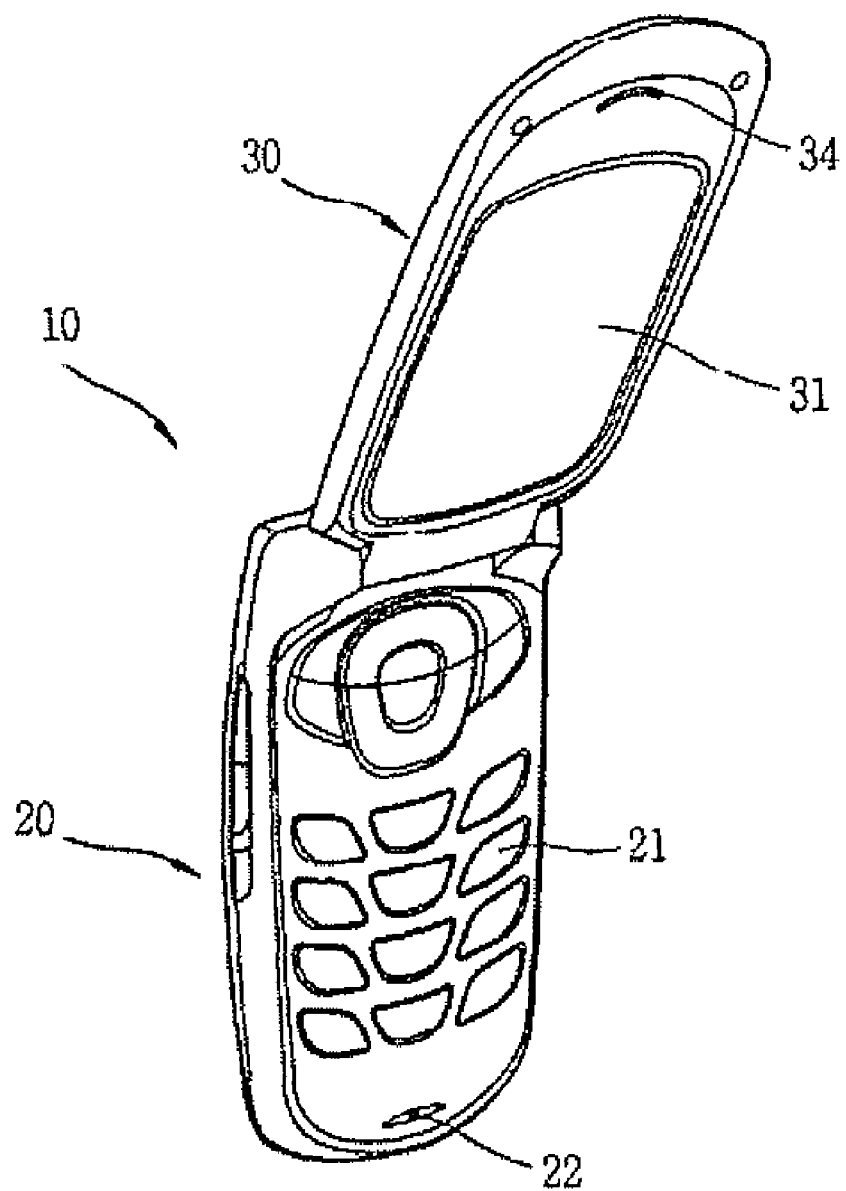
FIG. 2 is a perspective view of the conventional mobile communication terminal of FIG. 1, in an open state.
Figure 3:
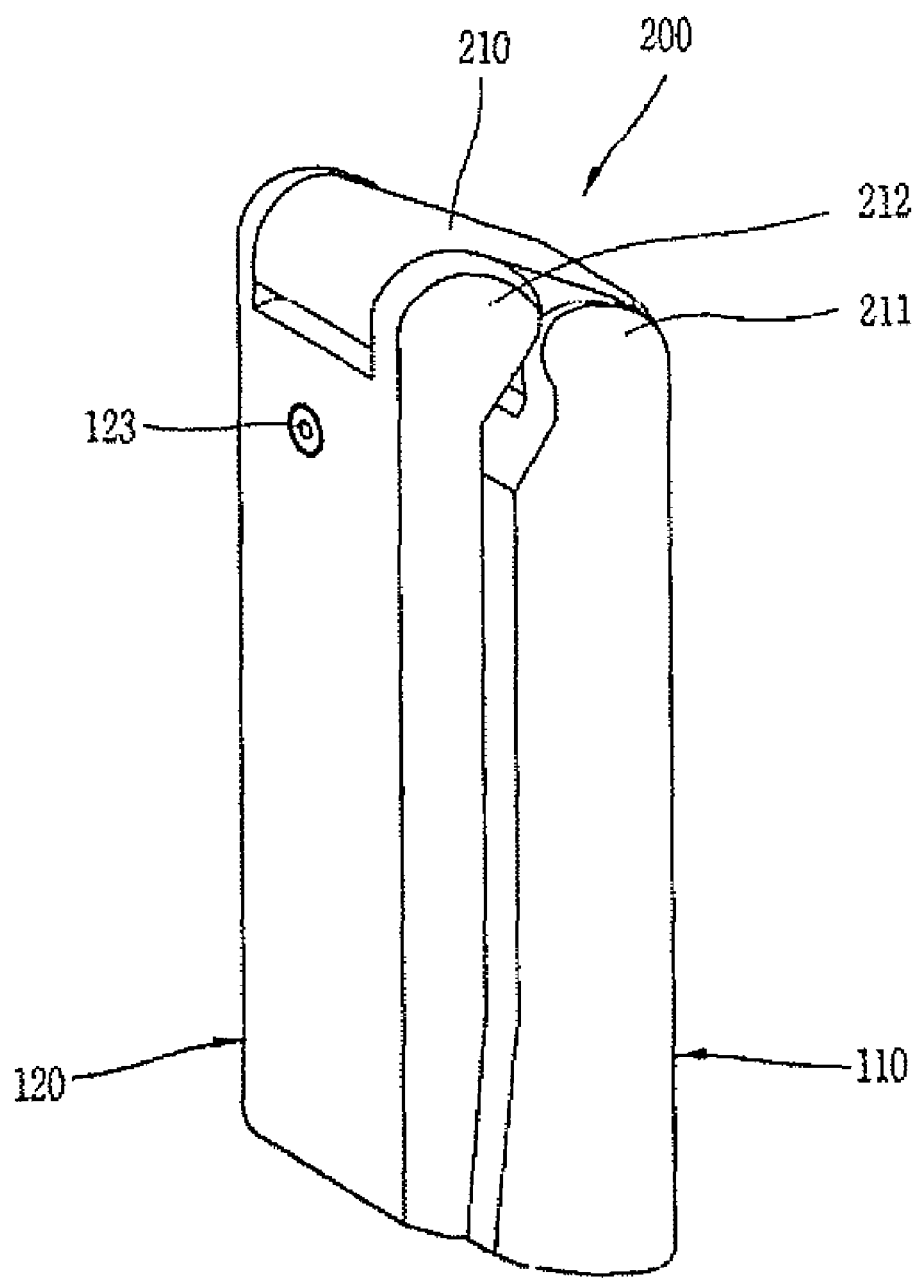
FIG. 3 is a perspective view of a mobile communication terminal according to one embodiment of the present invention.

FIG. 3 is a perspective view of a mobile communication terminal 100 in a closed state, in accordance with one aspect of the present invention.

The mobile communication terminal 100 shown in FIG. 3 includes a first body 110, a second body 120 which is foldably coupled to the first body 110, and an opening mechanism 200, provided between the first body 110 and the second body 120, which rotates the second body 120 open with respect to the first body 110 when a user slides the second body 120 downward.

Figure 4:
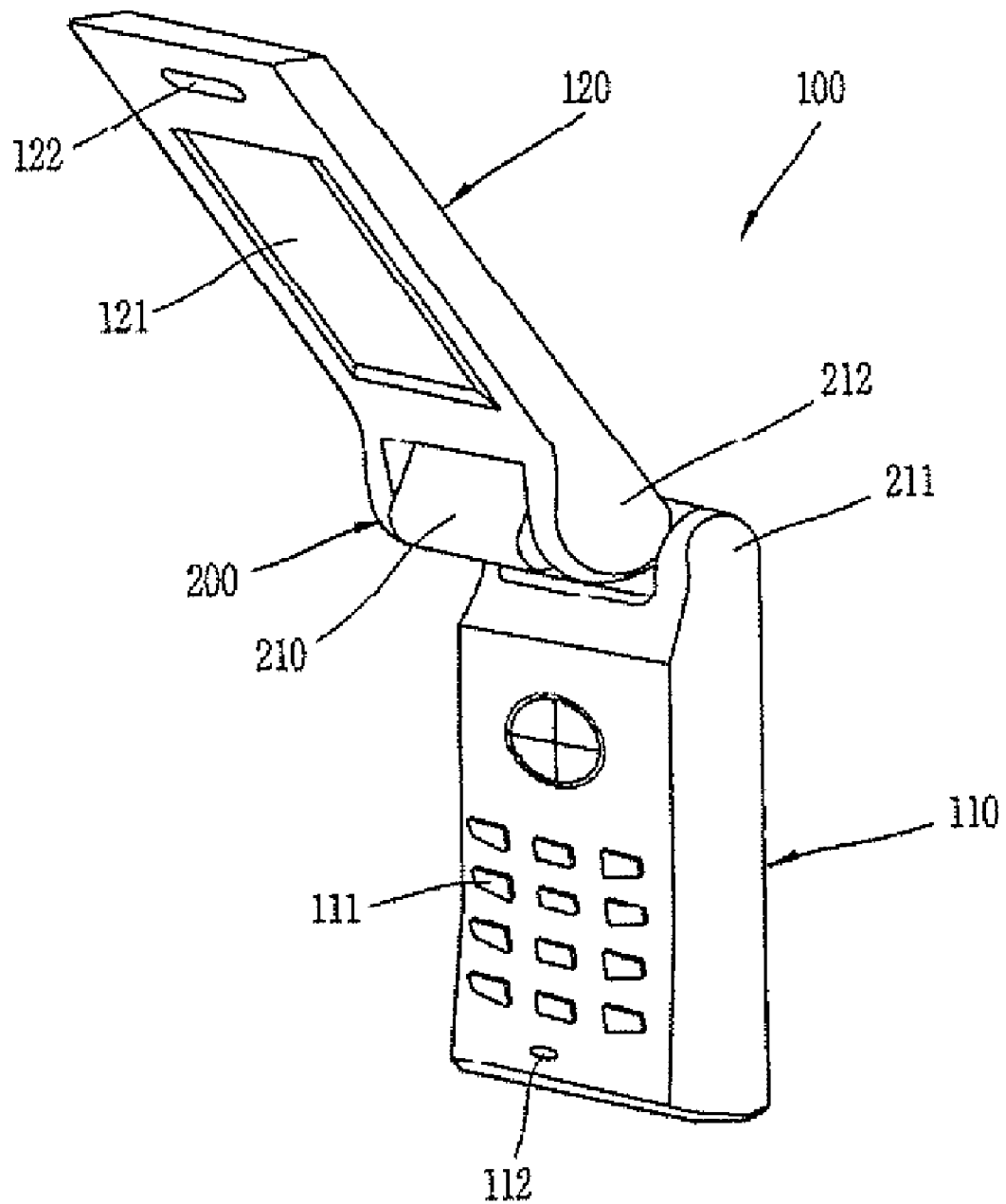
FIG. 4 is a perspective view of the mobile communication terminal of FIG. 3, in an open state.

In one exemplary embodiment, a main printed circuit board for the mobile communication terminal 100 can be provided within the first body 110, and, as shown in FIG. 4, a display 121 can be provided on an inner surface of the second body 120.

As shown in FIG. 3, in one exemplary embodiment, a camera 123 can be provided on an outer surface of the second body 120, and images captured by the camera 123 can be displayed on the display 121.

The opening mechanism 200 includes a hinge connection portion 210, a first hinge portion 211, and a second hinge portion 212. One end of the hinge connection portion connects to the first hinge portion 211, and another end of the hinge connection portion connects to the second hinge portion 212.

When a user slides the second body 120 downward with respect to the first body 110, an angle between the second body 120 and the hinge connection portion 210 increases, and an angle between the hinge connection portion 210 and the first body 110 decreases.

As shown in FIG. 3, when the second body 120 is closed, the hinge connection portion 210 is positioned at an incline, such that the second hinge portion 212 is positioned higher than the first hinge portion 211. When a user slides the second body 120 down, the second hinge portion 212 moves downward, and an angle between the hinge connection portion 210 and the second body 120 increases. A user can slide the second body 120 down by pulling a lower end of the second body 120 downward, or by pushing an end of the hinge connection portion 210 which connects to the second hinge portion 212 downward, for example.

To facilitate a downward rotation of the hinge connection portion 210, a width of the first body 110 may be tapered towards the top end of the first body 110.

To allow the second body 120 to be rotated by 360° with respect to the first body 110, the hinge connection portion 210 may have a length at least equal to the combined width of the first body 110 and the second body 120.

The second body 120 can be rotated with respect to the first body 110 by rotating the second body 120 with respect to the hinge connection portion 210, by rotating the hinge connection portion 210 with respect to the first body 110, or by some combination of the above. The opening mechanism 200 controls an opened angle of the second body 120 by controlling an angle between the first body 110 and the hinge connection portion 210, and controlling an angle between the second body 120 and the hinge connection portion 210.

FIG. 4 is a perspective view of the mobile communication terminal 100 when it is opened to a first predetermined angle.

In an exemplary, non-limiting embodiment, as shown in FIG. 4, a key pad 111 and a microphone 112 are provided on an inner surface of the first body 110. The key pad 111 includes a plurality of keys for inputting information and controls, and the microphone 112 receives a voice.

In the embodiment shown in FIG. 4, an inner surface of the second body 120 includes a display 121 which displays visual information, and a speaker 122 which outputs a voice signal.

When the mobile communication terminal 100 is opened as shown in FIG. 4, a user can place or receive a telephone call.

Figure 5:
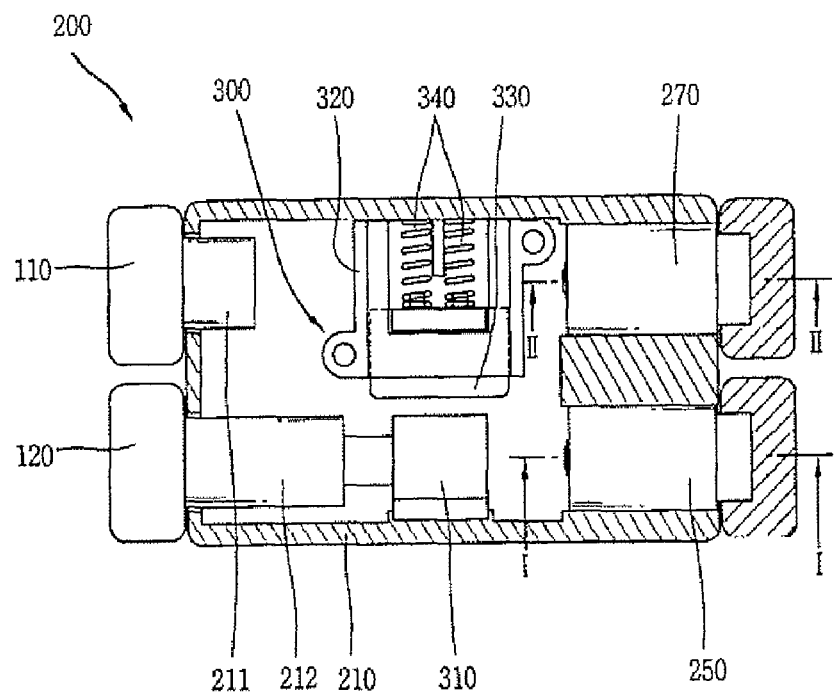
FIG. 5 is a plane sectional view showing an opening mechanism of the mobile communication terminal of FIG. 3.

FIG. 5 is a plane sectional view showing an embodiment of the opening mechanism 200 shown in FIG. 3

The opening mechanism 200 shown in FIG. 5 includes: a first elastic force providing unit 250, provided in the hinge connection portion 210 and coupled to the second body 120, which provides a rotating force to the second body 120 when the second body 120 is slid downwards, to rotate the second body 120 open; a second elastic force providing unit 270, provided in the hinge connection portion 210 and coupled to the first body 110, which provides a rotating force to the hinge connection portion 210 to restore an initial angle between the hinge connection portion 210 and the first body 110, after the second body 120 is slid downwards; and a stopper 300, provided in the hinge connection portion 210, which holds the second body 120 at a plurality of angles.

Figure 6:
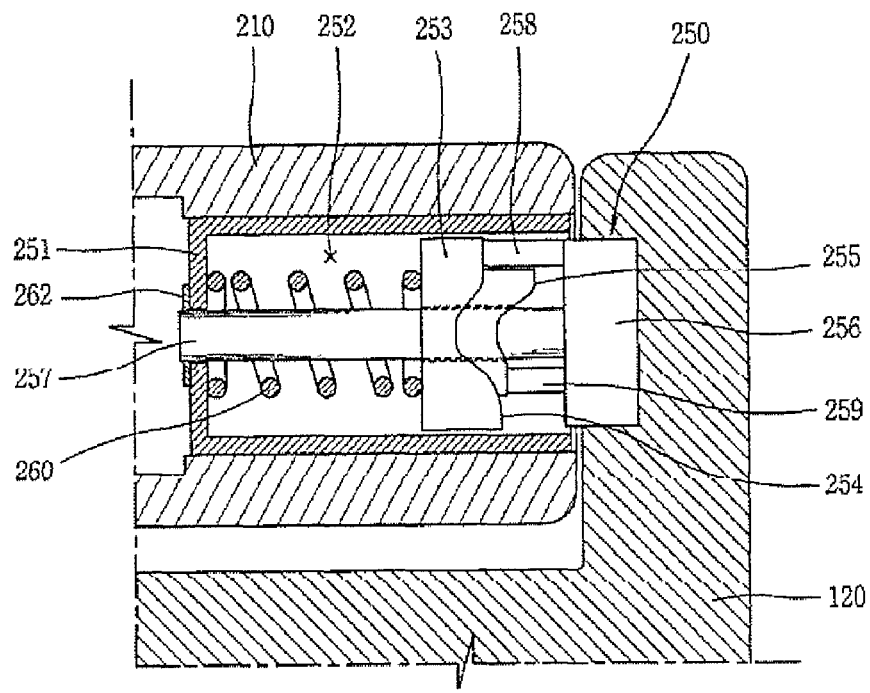
FIG. 6 is a sectional view taken along line I-I of FIG. 5.

FIG. 6 is a sectional view taken along line I-I of FIG. 5, showing an exemplary embodiment of the first elastic force providing unit 250. The first elastic force providing unit 250 shown in FIG. 6 includes: a housing 251 fixed to the hinge connection portion 210 and having a receiving space 252 therein; a fixed cam 256 fixed to the second body 120; a movable cam 253, linearly movable in the receiving space 252, which rotates the fixed cam 256 and the second body 120, when the second body 120 is slid downwards; and a spring 260, provided between the movable cam 253 and the housing 251, which elastically moves the movable cam 253 towards the fixed cam 256.

The movable cam 253 shown in FIG. 6 moves linearly along a cam shaft 257, which is integrally formed with the fixed cam 256. One end of the cam shaft 257 is fixed to a rear portion of the housing 251 with a fixing ring 262.

The movable cam 253 includes a first cam profile 254 having a first radius and a second cam profile 255 having a second radius. The first and second cam profiles 254 and 255 are centered around the cam shaft 257, and are symmetrical to each other. The fixed cam 256 includes first and second cam followers 258 and 259, which follow the first and second cam profiles 254 and 255, respectively.

Figure 8:
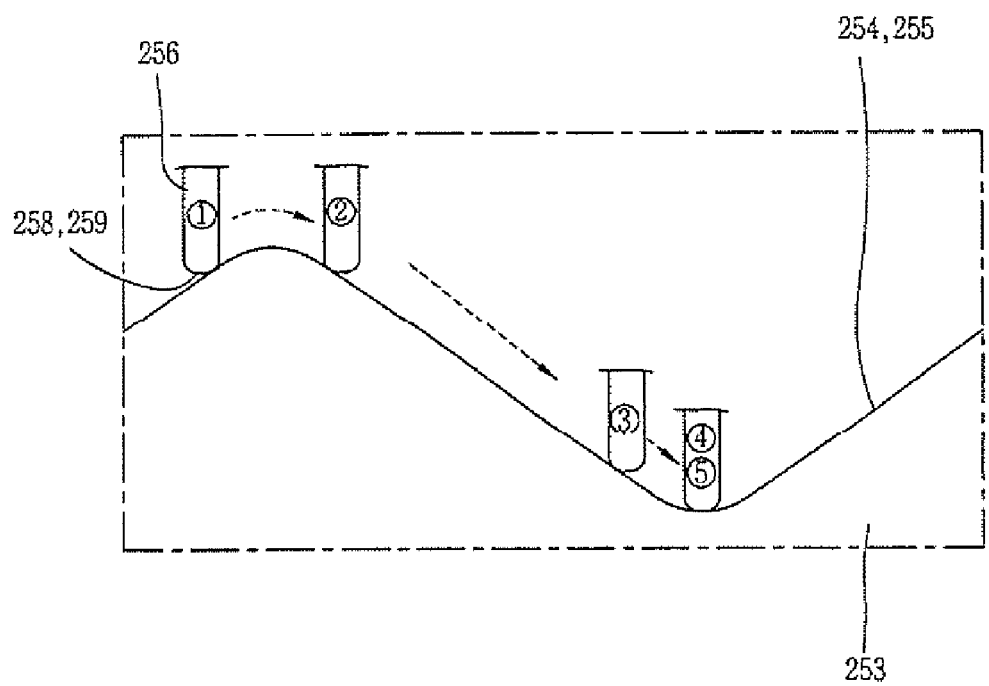
FIG. 8 is an illustration of the movement of cam followers of a first elastic force providing unit.

FIG. 8 illustrates the movement of the cam followers 258 and 259 along the cam profiles 254 and 255.

The cam followers 258 and 259 move along the cam profiles 254 and 255 in correspondence with the rotation angle of the second body 120. Position 1 of the cam followers 258 and 259, shown in FIG. 8, corresponds to the position of the second body 120 when it is closed, as shown in FIG. 3. When a user slides the second body 120 down, the angle between the second body 120 and the hinge connection portion 210 changes. Accordingly, the fixed cam 256, which is fixed to the second body 120, rotates with respect to the movable cam 253, which is connected to the hinge connection portion 210. As the fixed cam 256 rotates, the cam followers 258 and 259 move along the cam profiles 254 and 255.

As shown in FIG. 8, the rotation of the fixed cam 256 causes the cam followers 258 and 259 to move up a peak portion of the cam profiles 254 and 255, which pushes the movable cam 253 away from the fixed cam 256. If the user slides the second body 120 downward by enough of an amount for the cam followers 258 and 259 to pass over the peak portion of the cam profiles 254 and 255, the second body 120 will spring open when the user releases it.

That is, if the user releases the second body 120 when the cam followers 258 and 259 are at position 2 of FIG. 8, the spring 260 will push the movable cam 253 towards the fixed cam 256, causing the cam followers 258 and 259 to slide to position 3 of FIG. 8. As the cam followers 258 and 259 slide to position 3, the fixed cam 256 rotates, thus rotating the second body 120 open as well.

Figure 7:
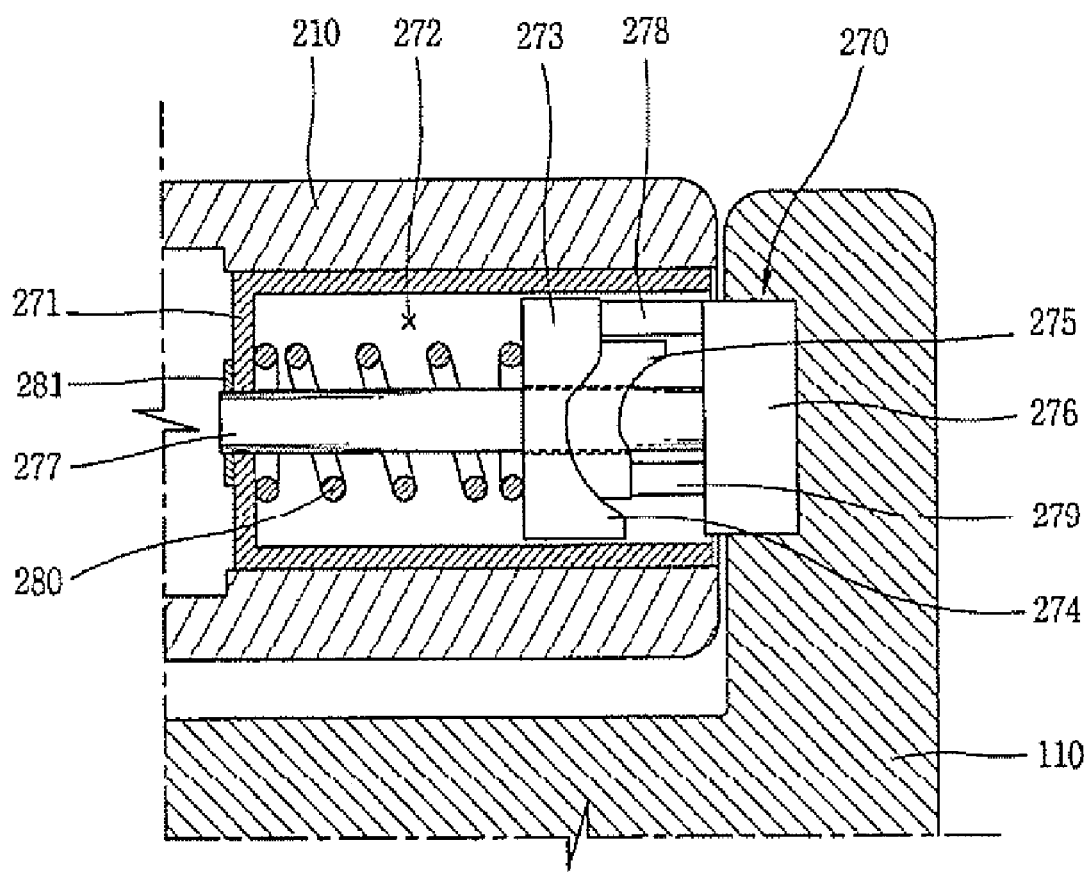
FIG. 7 is a sectional view taken along line II-II of FIG. 5.

FIG. 7 is a sectional view taken along line II-II of FIG. 5, showing an exemplary embodiment of the second elastic force providing unit 270. The second elastic force providing unit 270 shown in FIG. 7 includes: a housing 271 fixed to the hinge connection portion 210 and having a receiving space 272 therein; a fixed cam 276 fixed to the first body 110; a movable cam 273, linearly movable in the receiving space 272, which rotates the fixed cam 276 and the first body 110, to restore an initial angle between the hinge connection portion 210 and the first body 110 after the second body 120 is slid downwards; and a spring 280, provided between the movable cam 273 and the housing 271, which elastically moves the movable cam 273 towards the fixed cam 276.

The movable cam 273 shown in FIG. 7 moves linearly along a cam shaft 277, which is integrally formed with the fixed cam 276. One end of the cam shaft 277 is fixed to a rear portion of the housing 271 with a fixing ring 281.

The movable cam 273 includes a first cam profile 274 having a first radius and a second cam profile 275 having a second radius. The first and second cam profiles 274 and 275 are centered around the cam shaft 277, and are symmetrical to each other. The fixed cam 276 includes first and second cam followers 278 and 279, which follow the first and second cam profiles 274 and 275, respectively.

Figure 9:
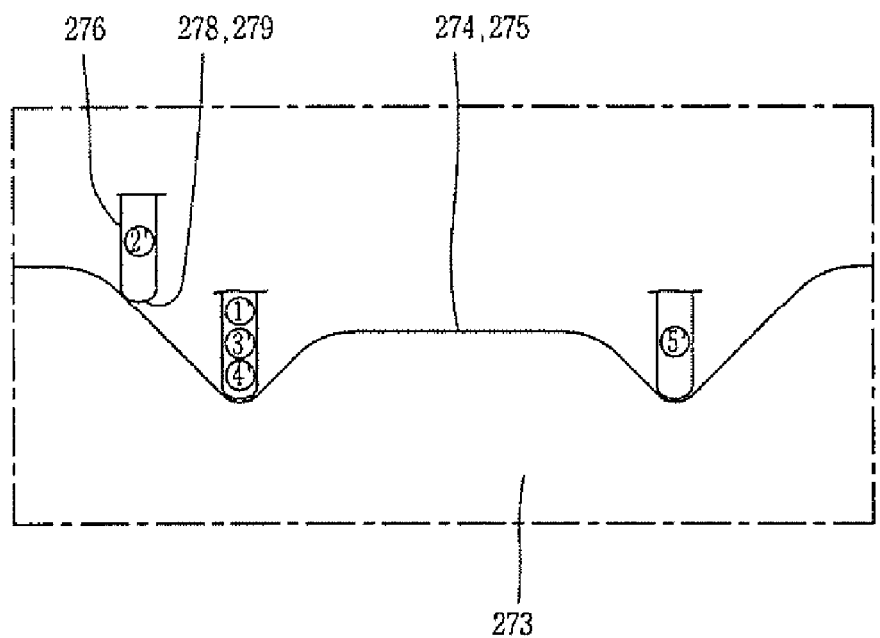
FIG. 9 is an illustration of the movement of cam followers of a second elastic force providing unit.

FIG. 9 illustrates the movement of the cam followers 278 and 279 along the cam profiles 274 and 275.

The cam followers 278 and 279 move along the cam profiles 274 and 275 in correspondence with the rotation of the hinge connection portion 210 with respect to the first body 110. Position 1' of the cam followers 278 and 279, shown in FIG. 9, corresponds to the position of the hinge connection portion 210 when the second body 120 is closed, as shown in FIG. 3. When a user slides the second body 120 down, the angle between the hinge connection portion 210 and the first body 110 changes. Accordingly, the movable cam 273, which is connected to the hinge connection portion 210, rotates with respect to the fixed cam 276, which is fixed to the first body 110. As the movable cam 273 rotates, the cam followers 278 and 279 move along the cam profiles 274 and 275.

As shown in FIG. 9, the rotation of the movable cam 273 causes the cam followers 278 and 279 to move towards position 2', which pushes the movable cam 273 away from the fixed cam 276.

If the user releases the second body 120 when the cam followers 278 and 279 are at position 2' of FIG. 9, the spring 280 will push the movable cam 273 towards the fixed cam 276, causing the cam followers 278 and 279 to slide into the groove portion of cam profiles 274 and 275, shown at position 3' of FIG. 9, which corresponds to initial position 1'. Thus, as the cam followers 278 and 279 slide back into the groove portion, the fixed cam 276 rotates back to its initial position, thus rotating the hinge connection portion 210 back to its initial position with respect to the first body 110.

Figure 10:
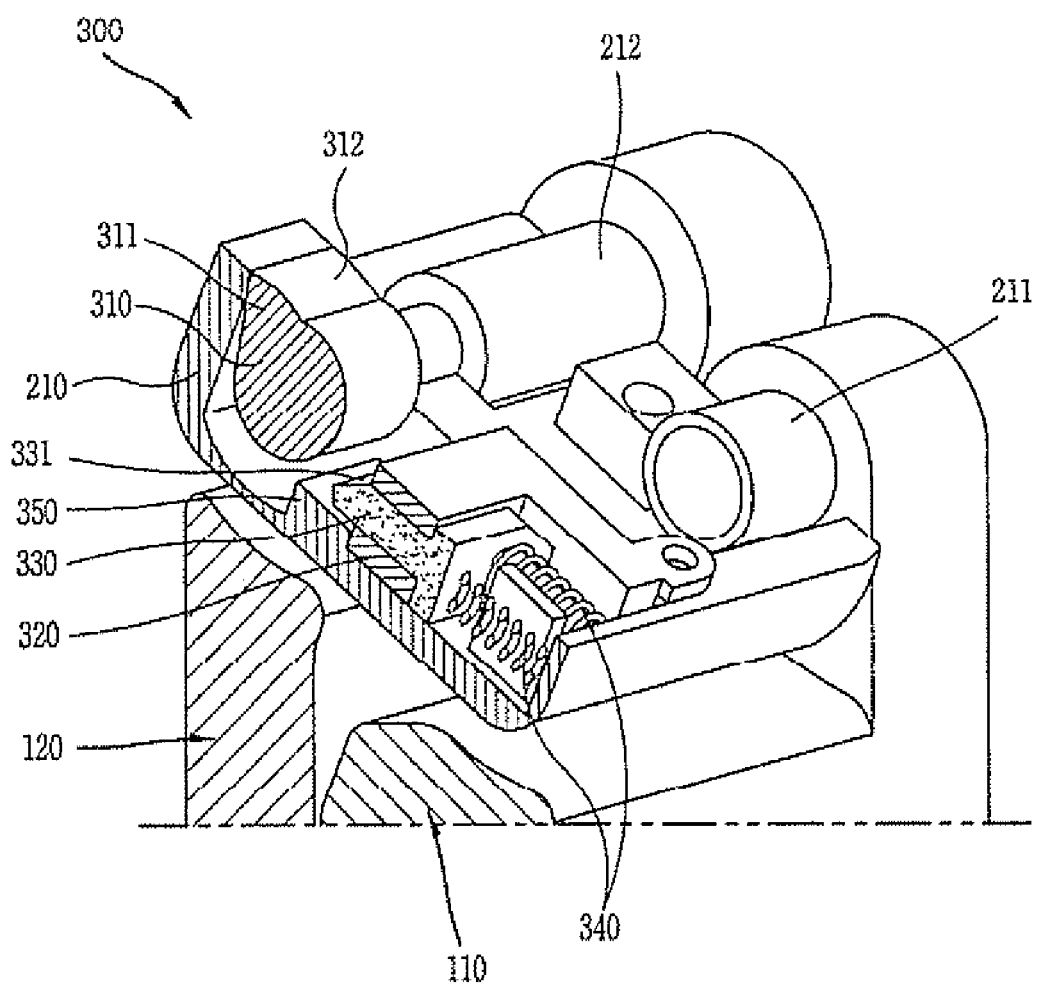
FIG. 10 is a partial perspective view showing a stopper of the opening mechanism of FIG. 5.

FIG. 10 is a partial perspective view showing an exemplary embodiment of the stopper 300 shown in FIG. 5.

The stopper 300 shown in FIG. 10 is provided within the hinge connection portion 210 and includes: a cam 310 which is fixed to the hinge portion 212 of the second body 120; a linearly movable operation rod 330 which stops a rotation of the cam 310; a guide member 320 which guides a linear motion of the operation rod 330; at least one spring 340, which pushes the operation rod 330 towards the cam 310; and a stopping jaw 350 which limits the rotation of the cam 310.

At least one protrusion 311 is formed on the cam 310. The protrusion 311 has a stopping surface 312 which contacts a stopping surface 331 of the operation rod 330. The stopping surface 331 stops a rotation of the cam 310 to hold the second body 120 open at a first predetermined angle with respect to the first body 110, such as, for example, an angle of 150°. This first predetermined angle may correspond to a first operation mode of the mobile communication terminal, such as, for example, a calling mode.

The stopping surface 312 and the stopping surface 331 are formed to have the same inclination angle. When the stopping surface 312 comes into contact with the stopping surface 331, the cam 310 is stopped, and the second body 120 is held open at the first predetermined angle. At this point, a user may open the second body 120 further by applying pressure to the second body 120. When this occurs, the stopping surface 312 of the cam 310 presses against the stopping surface 331, pushing the operation rod 330 back against the spring 340.

The cam 310 may be rotated until the protrusion 311 abuts the stopping jaw 350. At this point, the second body 120 is held open at a second predetermined angle with respect to the first body 110, such as, for example, an angle of 180°. The second predetermined angle may correspond to a second operation mode, such as, for example, a camera mode. In this regard, if a camera 123 is provided on an outer surface of the second body 120, it will be conveniently located at a 180° angle from the first body 110.

At this point, a user can open the second body 120 even further. However, at this point, since the cam 310 cannot rotate any further, the second body 120 does not rotate any further with respect to the hinge connection portion 210. Instead, the second body 120 is opened further by rotating the hinge connection portion 210 with respect to the first body 110. In this regard, the second body 120 can be opened all the way to a 360° angle with respect to its initial position, flush against the first body 110.

FIGS. 11A to 11E illustrate an operation of the mobile communication terminal 200 shown in FIG. 3, and FIGS. 12A to 12E illustrate an operation of the stopper 300 shown in FIG. 10.

FIGS. 11A and 12A illustrate an initial, closed state of the mobile communication terminal 200. During this state, the cam followers 258 and 259 of the fixed cam 256 of the first elastic force providing unit 250 are positioned at position 1 in FIG. 8, and the cam followers 278 and 279 of the fixed cam 276 of the second elastic force providing unit 270 are positioned at position 1' in FIG. 9.

When a user slides the second body 120 down with respect to the first body 110, the hinge connection portion 210 rotates downward, as shown in FIG. 11B.

At this point, the cam followers 258 and 259 of the fixed cam 256 of the first elastic force providing unit 250 have passed a peak portion of the cam profiles 254 and 255 of the movable cam 253 of the first elastic force providing unit 250, and are positioned at position 2, as shown in FIG. 8.

At this point the cam followers 278 and 279 of the fixed cam 276 of the second elastic force providing unit 270 are positioned at position 2', as shown in FIG. 9.

When a user releases the second body 120, the spring 260 of the first elastic force providing unit 250 causes the cam followers 258 and 259 to slide to position 3 of FIG. 8, thus rotating the fixed cam 253 of the first elastic force providing unit 250, and causing the second body 120 to spring open to the position shown in FIG. 11C.

At the same time, when the user releases the second body 120, the spring 280 of the second elastic force providing unit 270 causes the cam followers 278 and 279 to move to position 3' of FIG. 9, thus rotating the fixed cam 273 of the second elastic force providing unit and causing the hinge connection portion 210 to return to its initial position, as shown in FIG. 11C.

As can be seen, the first and second elastic force providing units 250 and 270 thus operate independently of each other. The first elastic force providing unit 250 controls the rotation of the second body 120 with respect to the hinge connection portion 210, and the second elastic force providing unit 270 controls the rotation of the hinge connection portion 210 with respect to the first body 110.

As shown in FIGS. 12A to 12C, the cam 310 rotates along with the second body 120. When the cam 310 abuts the stopping surface 331 of the operation rod 330, as shown in FIG. 12C, the cam 310 and the second body 120 stop rotating and is held at a first predetermined angle, as shown in FIG. 11C, such as, for example, an angle of 150°. This first predetermined angle may correspond to a first operation mode of the mobile communication terminal 200, such as, for example, a calling mode.

A user may continue to rotate the second body 120 by forcibly rotating the second body 120 to a second predetermined angle, as shown in FIG. 11D, such as, for example, an angle of 180°.

When the second body 120 is rotated to the second predetermined angle, the fixed cam 253 of the first elastic force providing unit 250 is also rotated, causing the cam followers 258 and 259 of the first elastic force providing unit 250 to move to position 4 of FIG. 8

Figure 12D:
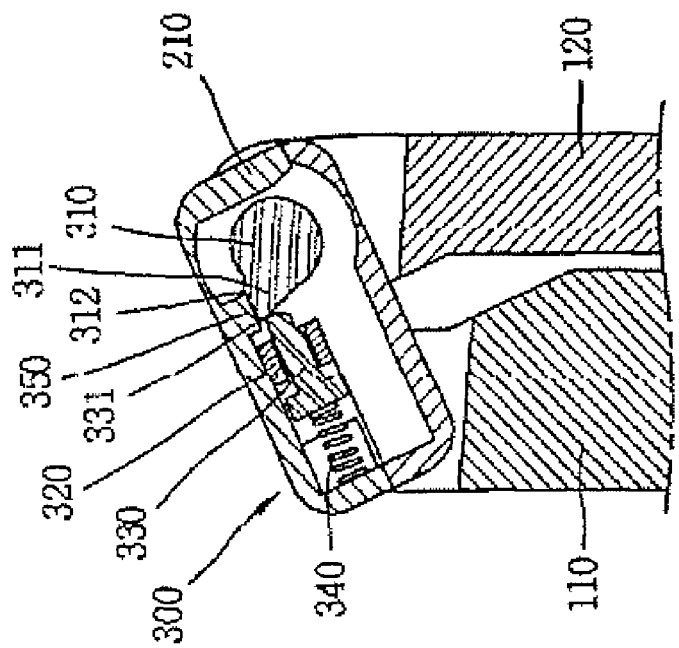
Figure 12E:
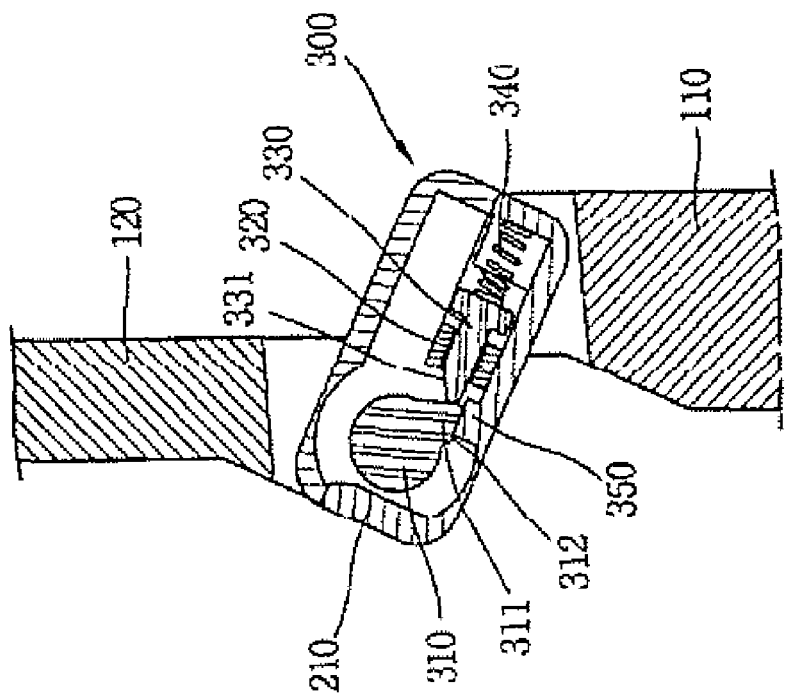

As shown in FIG. 12D, when the user rotates the second body 120 to the position shown in FIG. 11D, the protrusion 311 of the cam 310 pushes the operation rod 330 backward, and the stopping jaw 350 prevents the cam 310 from rotating further. As the cam 310 is fixed to the second body 120, the stopping jaw 350 also prevents the second body 120 from rotating further with respect to the hinge connection portion 210.

Since the hinge connection portion 210 does not rotate with respect to the first body 110 between the positions shown in FIGS. 11C and 11D, the cam followers 278 and 279 of the second elastic force providing unit 270 do not move, as indicated by position 4' of FIG. 9.

Once the second body 120 is positioned as shown in FIG. 11D, it may then be further rotated to the position shown in FIG. 11E. However, since the stopper 300 prevents the second body 120 from rotating any further with respect to the hinge connection portion 210, further rotation of the second body 120 is achieved at this point by rotating the hinge connection portion 210 with respect to the first body 110.

When the user forcibly rotates the second body 120 from the position shown in FIG. 11D to the position shown in FIG. 11E, since the second body 120 does not rotate with respect to the hinge connection portion 210, the cam followers 258 and 259 of the first elastic force providing unit 250 do not move, as indicated by position 5 in FIG. 8. However, since the hinge connection portion 210 rotates with respect to the first body 110, the cam followers 278 and 279 of the second elastic force providing unit 270 move to position 5' shown in FIG. 9.

When the second body 120 is positioned as shown in FIG. 11E, the display 121 shown in FIG. 4 is positioned on a rear surface of the mobile communication terminal 200, which is convenient for viewing the display. Thus, in one exemplary embodiment, a user can view moving images on the display 121 in this position (using, for example, a video on demand (VOD) or digital multimedia broadcasting (DMB) service).

Figure 13:
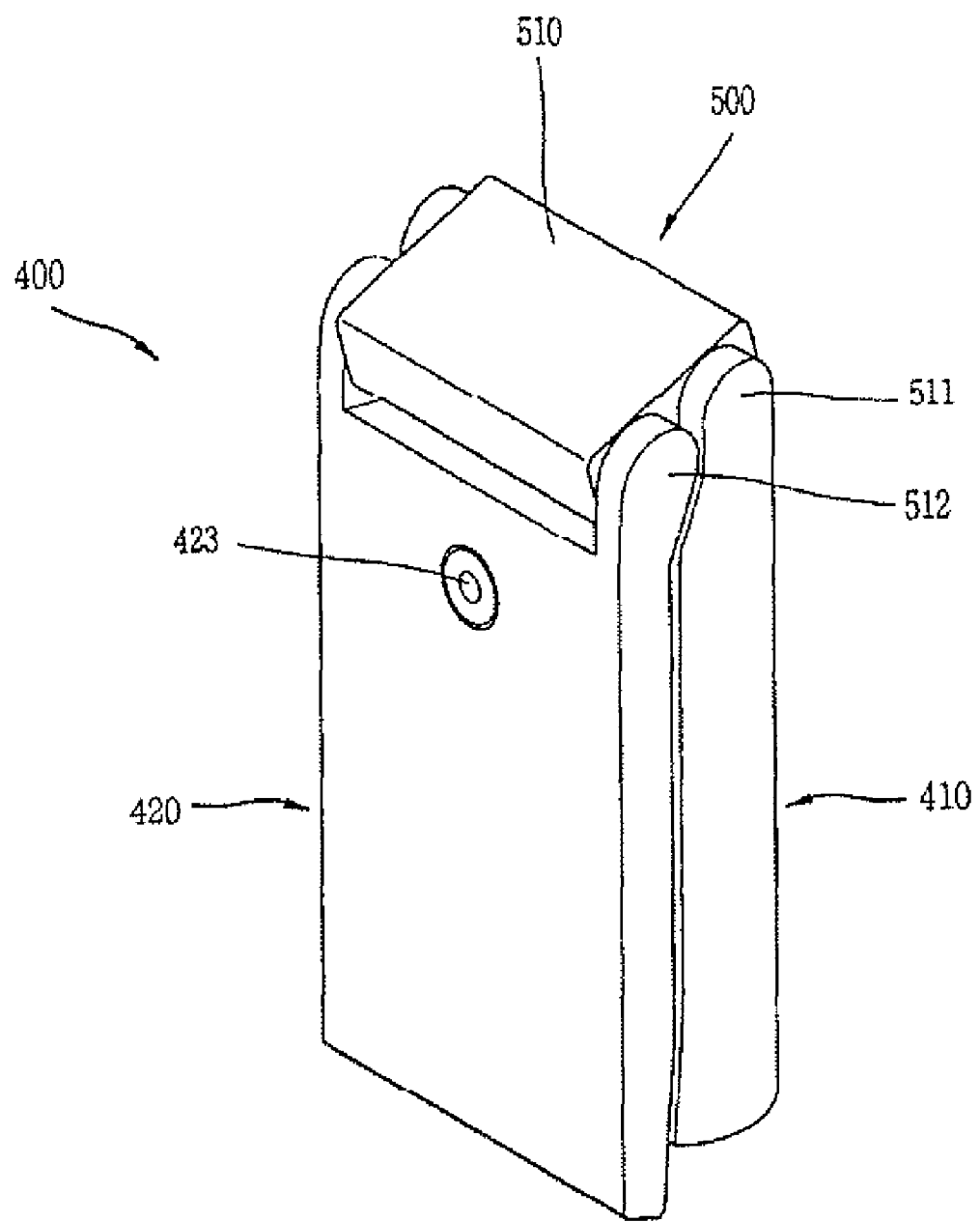
FIG. 13 is a perspective view of a mobile communication terminal according to another embodiment of the present invention.

FIG. 13 is a perspective view of a mobile communication terminal 400 in a closed state, which is an alternate embodiment of the mobile communication terminal 200 shown in FIG. 3.

The mobile communication terminal 400 shown in FIG. 13 includes a first body 410, a second body 420 which is foldably coupled to the first body 410, and an opening mechanism 500, provided between the first body 410 and the second body 420, which rotates the second body 420 open with respect to the first body 410 when a user slides the second body 420 upward.

Figure 14:
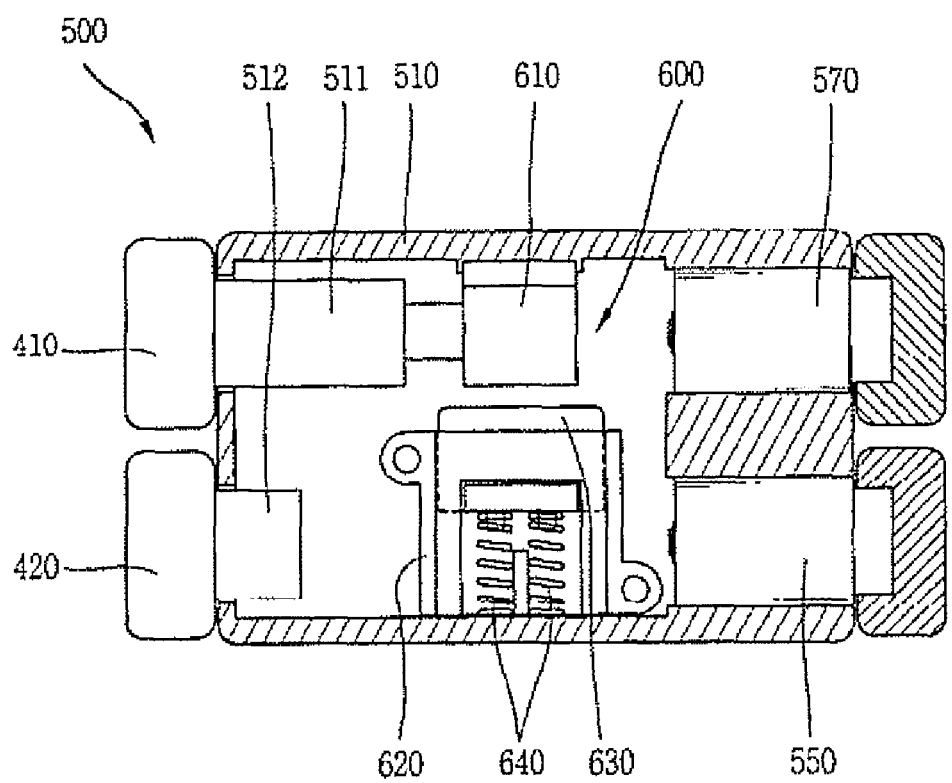
FIG. 14 is a plane sectional view of an opening mechanism of the mobile communication terminal of FIG. 13.

FIG. 14 is a plane sectional view showing an embodiment of the opening mechanism 500 shown in FIG. 13. The opening mechanism 500 shown in FIG. 14 includes: a first hinge portion 511; a second hinge portion 512; a first elastic force providing unit 550, a second elastic force providing unit 570, and a stopper 600. The stopper 600 includes: a cam 610 which is fixed to the hinge portion 511; a linearly movable operation rod 630 which stops a rotation of the cam 610; a guide member 620 which guides a linear motion of the operation rod 630; at least one spring 640, which pushes the operation rode 630 towards the cam 610; and a stopping jaw 650 which limits the rotation of the cam 610. The function of the opening mechanism 500 is the same as function of the opening mechanism 200, only it is arranged in an opposite manner. Thus, further discussion of its construction and operation will be omitted.

FIGS. 15A to 15E illustrate an operation of the mobile communication terminal 400 shown in FIG. 13, and FIGS. 16A to 16E illustrate an operation of the stopper 600 shown in FIG. 14.

FIGS. 15A and 16A illustrate an initial, closed state of the mobile communication terminal 400, in which the second body 420 sits lower than the first body 410.

When a user slides the second body 420 upwards with respect to the first body 410, the hinge connection portion 510 rotates upward, as shown in FIG. 15B.

When a user releases the second body 420, the first elastic force providing unit 550 restores the angle between the second body 420 and the hinge connection portion 510 to its initial angle, and the second elastic force providing unit 570 causes the second body 420 to spring open by rotating the hinge connection portion 510 with respect to the first body 410, as shown in FIG. 15C.

Thus, the second elastic force providing unit 570 of the mobile communication terminal 400 functions the same as the first elastic force providing unit 250 of the mobile communication terminal 200.

As shown in FIGS. 16A to 16C, the cam 610 rotates as the hinge connection portion 510 rotates with respect to the first body 410. When a stopping surface 612 of the cam 610 abuts the stopping surface 631 of the operation rod 630, as shown in FIG. 16C, the cam 610 and the hinge connection portion 510 stop rotating.

A user may then continue to rotate the second body 420 to the position shown in FIG. 15D, by rotating the connection portion 510.

Figure 16D:
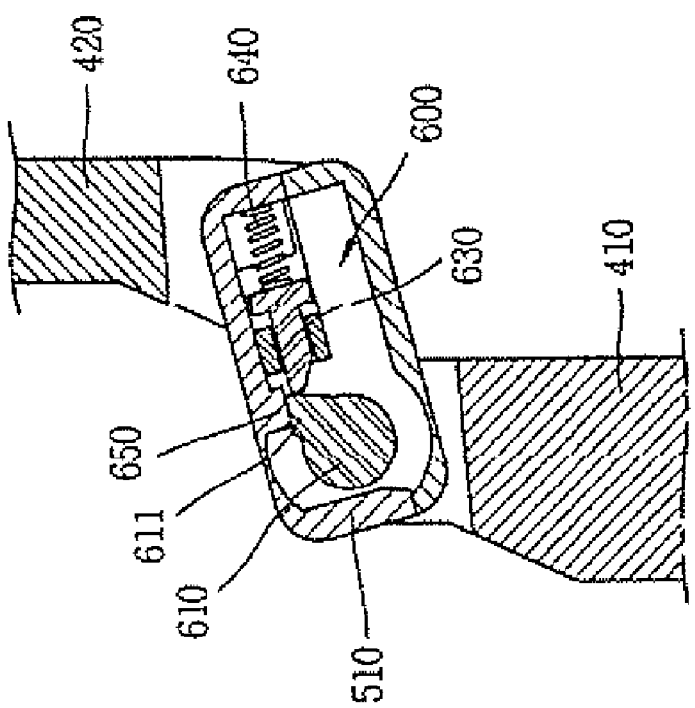
Figure 16E:
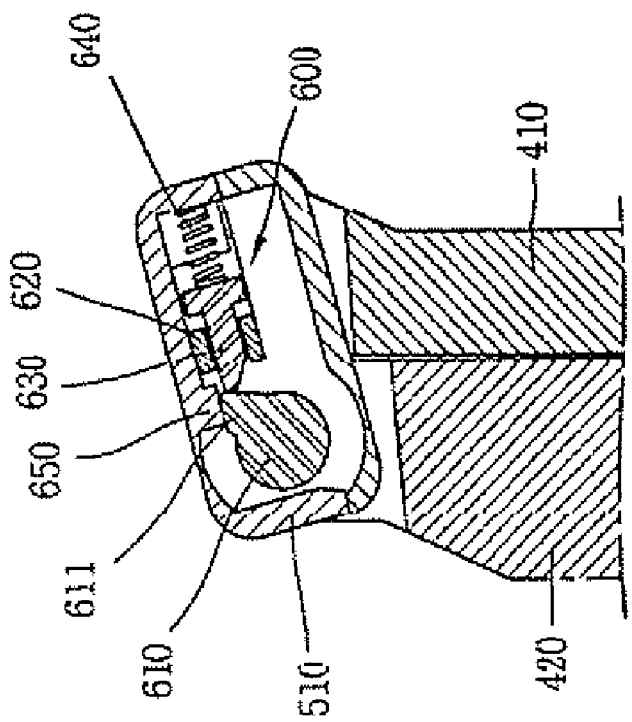

As shown in FIG. 16D, a protrusion 611 of the cam pushes the operation rod 630, until it is stopped by a stopping jaw 650.

At this point, the second body 420 may be further rotated. However, since the stopper 600 prevents the hinge connection portion 510 from rotating further, the rotation of the second body 420 is achieved by rotating the second body 420 with respect to the hinge connection portion 510, as shown in FIG. 15E.

The mobile communication terminal described above provides convenience to a user in that it automatically springs open when a user merely slides a second body up or down.

A further advantage of the herein described mobile communication terminal is its effective utilization of a display, due to the various angles at which the second body may be held open.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to an exemplary embodiment, it is understood that the words that have been used are words of description and illustration, rather than words of limitation. As the present invention may be embodied in several forms without departing from the spirit or essential characteristics thereof, it should also be understood that the above-described embodiment is not limited by any of the details of the foregoing description, unless otherwise specified. Rather, the above-described embodiment should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. A mobile communication terminal, comprising:
   a first body;
   a second body foldably coupled to the first body;
   a hinge connection portion having one end connected to the first body by a first hinge portion, and another end connected to the second body by a second hinge portion;
   a first elastic force providing unit, provided in the hinge connection portion, that rotates the second body open when the second body is slid downward; and
   a second elastic force providing unit installed between the first body and the hinge connection portion, provided in the hinge connection portion, that restores the hinge connection portion to an initial position after a force which causes the sliding movement of the second body is removed; and
   a stopper provided in the hinge connection portion and configured to hold the second body open at a plurality of angles, wherein the stopper comprises:
      a cam fixed to the second hinge portion;
      a linearly movable operation rod that stops a rotation of the cam; and
      a spring that pushes the operation rod towards the cam.

2. The mobile communication terminal according to claim 1, wherein the hinge connection portion is inclinably arranged so that the second hinge portion is positioned higher than the first hinge portion when the second body is closed.

3. The mobile communication terminal according to claim 1, wherein the first elastic force providing unit comprises:
   a housing fixed to the hinge connection portion and having a receiving space therein;
   a fixed cam fixed to the second body;
   a movable cam, linearly movable in the receiving space of the housing, that rotates the fixed cam such that the second body rotates open when the second body is slid downward; and
   a spring, provided between the movable cam and the housing, that elastically moves the movable cam towards the fixed cam.

4. The mobile communication terminal according to claim 3, wherein the movable cam has a cam profile defining a spacing between the movable cam and the fixed cam.

5. The mobile communication terminal according to claim 3, wherein the movable cam includes a first cam profile having a first radius and a second cam profile having a second radius, the first and second cam profiles being symmetrical and centered on a cam shaft.

6. The mobile communication terminal according to claim 1, wherein the second elastic force providing unit comprises:
   a housing fixed to the hinge connection portion and having a receiving space therein;
   a fixed cam fixed to the first body;
   a movable cam, linearly movable in the receiving space of the housing, that rotates the fixed cam such that the hinge connection portion is restored to the initial position; and
   a spring, provided between the movable cam and the housing, that elastically moves the movable cam towards the fixed cam.

7. The mobile communication terminal according to claim 6, wherein the movable cam of the second elastic force providing unit has a cam profile defining a spacing between the movable cam of the second elastic force providing unit and the fixed cam of the second elastic force providing unit.

8. The mobile communication terminal according to claim 6, wherein the movable cam of the second elastic force providing unit includes a first cam profile having a first radius and a second cam profile having a second radius, the first and second cam profiles of the movable cam of the second elastic force providing unit being symmetrical and centered on a cam shaft.

9. The mobile communication terminal according to claim 1, wherein the stopper comprises a guide member that guides the operation rod.

10. The mobile communication terminal according to claim 1, wherein the stopper comprises a stopping jaw that stops a rotation of the cam when the cam pushes the operation rod.

11. The mobile communication terminal according to claim 10, wherein the stopping jaw holds the second body open at an angle of 360° with respect to the first body.

12. The mobile communication terminal according to claim 1, wherein a protrusion is formed on the cam which abuts a stopping surface of the operation rod.

13. The mobile communication terminal according to claim 1, wherein the stopper holds the second body at angles of 150° and 180°.

14. The mobile communication terminal according to claim 1, wherein the first body comprises a terminal body, and the second body comprises a display unit that displays visual information.

15. A mobile communication terminal, comprising:
   a first body;
   a second body foldably coupled to the first body;
   a hinge connection portion having one end connected to the first body by a first hinge portion, and another end connected to the second body by a second hinge portion;
   a first elastic force providing unit, provided in the hinge connection portion, that restores an angle between the second body and the hinge connection portion when the second body is slid upward; and a second elastic force providing unit installed between the first body and the hinge connection portion, provided in the hinge connection portion, that causes the second body to spring open by the rotating the hinge connection portion with respect to the first body; and a stopper provided in the hinge connection portion and configured to hold the second body open at a plurality of angles, wherein the stopper comprises:

a cam fixed to the second hinge portion;

a linearly movable operation rod that stops a rotation of the cam; and a spring that pushes the operation rod towards the cam.

16. The mobile communication terminal according to claim 15, wherein the hinge connection portion is inclinably arranged so that the second hinge portion is positioned lower than the first hinge portion when the second body is closed.

17. The mobile communication terminal according to claim 15, wherein the first elastic force providing unit comprises:

a housing fixed to the hinge connection portion and having a receiving space therein;

a fixed cam fixed to the second body;

a movable cam, linearly movable in the receiving space of the housing, that restores the angle between the second body and the hinge connection portion when the second body is slid upward; and a spring, provided between the movable cam and the housing, that elastically moves the movable cam towards the fixed cam.

18. The mobile communication terminal according to claim 17, wherein the movable cam has a cam profile defining a spacing between the movable cam and the fixed cam.

19. The mobile communication terminal according to claim 17, wherein the movable cam includes a first cam profile having a first radius and a second cam profile having a second radius, the first and second cam profiles being symmetrical and centered on a cam shaft.

20. The mobile communication terminal according to claim 15, wherein the second elastic force providing unit comprises:

a housing fixed to the hinge connection portion and having a receiving space therein;

a fixed cam fixed to the first body;

a movable cam, linearly movable in the receiving space of the housing, that causes the second body to spring open by the rotating the hinge connection portion with respect to the first body; and a spring, provided between the movable cam and the housing, that elastically moves the movable cam towards the fixed cam.

21. The mobile communication terminal according to claim 20, wherein the movable cam of the second elastic force providing unit has a cam profile defining a spacing between the movable cam of the second elastic force providing unit and the fixed cam of the second elastic force providing unit.

22. The mobile communication terminal according to claim 20, wherein the movable cam of the second elastic force providing unit includes a first cam profile having a first radius and a second cam profile having a second radius, the first and second cam profiles of the movable cam of the second elastic force providing unit being symmetrical and centered on a cam shaft.

23. The mobile communication terminal according to claim 15, wherein the stopper comprises a guide member that guides the operation rod.

24. The mobile communication terminal according to claim 20, wherein the stopper comprises a stopping jaw that stops a rotation of the cam when the cam pushes the operation rod.

25. The mobile communication terminal according to claim 24, wherein the stopping jaw holds the second body open at an angle of 360° with respect to the first body.

26. The mobile communication terminal according to claim 15, wherein a protrusion is formed on the cam which abuts a stopping surface of the operation rod.

27. The mobile communication terminal according to claim 15, wherein the stopper holds the second body at angles of 150° and 180°.

* * * * *